US012100532B2

(12) United States Patent
Ushiwata et al.

(10) Patent No.: US 12,100,532 B2
(45) Date of Patent: Sep. 24, 2024

(54) INSULATED WIRE

(71) Applicant: Proterial, Ltd., Tokyo (JP)

(72) Inventors: Takami Ushiwata, Tokyo (JP); Hajime Nishi, Tokyo (JP); Ikumi Ando, Tokyo (JP); Yuki Honda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 31 days.

(21) Appl. No.: 17/532,225

(22) Filed: Nov. 22, 2021

(65) Prior Publication Data

US 2022/0165458 A1 May 26, 2022

(30) Foreign Application Priority Data

Nov. 26, 2020 (JP) ................................. 2020-195928
Oct. 28, 2021 (JP) ................................. 2021-176057

(51) Int. Cl.

| | |
|---|---|
| ***H01B 19/04*** | (2006.01) |
| ***H01B 7/02*** | (2006.01) |
| *B05D 7/20* | (2006.01) |
| *H01B 13/06* | (2006.01) |
| *H01B 13/32* | (2006.01) |

(52) U.S. Cl.

CPC ............... *H01B 19/04* (2013.01); *H01B 7/02* (2013.01); *B05D 7/20* (2013.01); *B05D 2256/00* (2013.01); *H01B 13/06* (2013.01); *H01B 13/329* (2013.01)

(58) Field of Classification Search

CPC ...... H01B 19/04; H01B 7/0208; H01B 13/06; H01B 13/16; H01B 13/329; H01B 13/36; B05D 7/20; B05D 2256/00

USPC .................................................. 427/117–120

See application file for complete search history.

(56) References Cited

U.S. PATENT DOCUMENTS 4,701,576 A * 10/1987 Wada ....................... H01B 7/40 174/120 SR
5,192,834 A * 3/1993 Yamanishi ........... H01B 7/0233 174/120 SR
8,901,184 B2 * 12/2014 Abe ........................ C08L 23/08 521/131
9,443,643 B2 * 9/2016 Muto ................... H01B 7/0216
10,418,151 B2 * 9/2019 Muto ........................ H02K 3/30
10,777,335 B2 * 9/2020 Nakano .................... H02K 3/30
10,962,498 B2 * 3/2021 Ota ........................ G01B 7/085
11,450,450 B2 * 9/2022 Hara ....................... H01B 3/421
2008/0264671 A1 * 10/2008 Kenny ................. H01B 7/1805 174/120 SR (Continued)

FOREIGN PATENT DOCUMENTS

JP H9-106712 A 4/1997

*Primary Examiner* — Brian K Talbot

(74) *Attorney, Agent, or Firm* — David D. Brush; Amanda M. Prose; Westman, Champlin & Koehler, P.A.

(57) ABSTRACT

In an insulated wire including a conductor formed into a long shape and an insulation film formed by stacking at least one insulating layer covering a circumference of the conductor, the insulating layer includes a porous region and a resin region. The porous region is formed of a resin and multiple voids, and the resin region is formed of the resin. In the insulating layer, a boundary surface is not provided between a first boundary surface located on a radially inner side and a second boundary surface located on a radially outer side, and the porous region and the resin region are arranged in this order from the first boundary surface toward the second boundary surface.

4 Claims, 8 Drawing Sheets

(56) References Cited

U.S. PATENT DOCUMENTS

| | | | | |
|---|---|---|---|---|
| 2011/0180298 | A1* | 7/2011 | Kato | C08L 75/16<br>521/157 |
| 2013/0014971 | A1* | 1/2013 | Muto | H01B 3/301<br>174/110 SR |
| 2014/0354394 | A1* | 12/2014 | Oya | H01B 7/292<br>428/394 |

* cited by examiner

| ITEM | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|---|---|
| PAINT | PAINT 1 | PAINT 2 | PAINT 3 | PAINT 1 | PAINT 1 | PAINT 2 | PAINT 2 | PAINT 3 | PAINT 3 |
| FOAMED/ UNFOAMED | FOAMED | FOAMED | FOAMED | UNFOAMED | FOAMED | UNFOAMED | FOAMED | UNFOAMED | FOAMED |
| RATIO OF THICKNESS OF RESIN REGION (%) | 50 | 20 | 20 | – | 0 | – | 0 | – | 2 |
| POROSITY (%) | 20 | 20 | 20 | – | 8 | – | 12 | – | 10 |
| PDIV(Vp) | 1000 | 980 | 850 | 870 | 890 | 840 | 920 | 720 | 750 |
| FLEXIBILITY | ○ | ○ | ○ | ○ | × | ○ | × | ○ | × |
| BREAKDOWN VOLTAGE (kV) | 16 | 15 | 15 | 17 | 6 | 16 | 7 | 17 | 5 |

FIG. 6

INSULATED WIRE

CROSS-REFERENCE TO RELATED APPLICATIONS

The present application claims the benefit of priority based on Japanese patent application No. 2020-195928 filed on Nov. 26, 2020 with the Japan Patent Office and Japanese patent application No. 2021-176057 filed on Oct. 28, 2021 with the Japan Patent Office, and the entire disclosures of Japanese patent application No. 2020-195928 and Japanese patent application No. 2021-176057 are incorporated herein by reference.

BACKGROUND

The present disclosure relates to an insulated wire.

An insulated wire including a conductor formed into a long shape and an insulation film provided on a peripheral surface of the conductor is known (for example, see JP H09-106712A).

The insulated wire is used, for example, in a coil of an industrial motor.

In the industrial motor, when high output is required, high voltage drive is performed. An inverter drive is also performed in which a speed of the motor is controlled by means of a variable voltage AC power supply or a variable frequency AC power supply using an inverter.

SUMMARY

In the inverter drive, switching may cause reflection at an impedance discontinuity point, resulting in an inverter surge that is a phenomenon in which a voltage about twice as high as the output voltage is applied.

The high voltage applied to the industrial motor for the high voltage drive and the inverter surge generated in the inverter drive may cause a partial discharge in the insulation film of the insulated wire used for the coil of the motor. When the partial discharge occurs, erosion of the insulation film may occur and an insulation failure may be caused.

To solve this problem, it is conceivable, by use of an insulation film with a low relative permittivity, to increase a partial discharge inception voltage and to inhibit the occurrence of the partial discharge. In order to lower the relative permittivity of the insulation film, it is conceivable to form multiple voids in the insulation film.

However, when the multiple voids are formed in the insulation film, for example, the multiple voids in the insulation film may be combined (also referred to as "connected") continuously along a thickness direction of the insulation film. When an insulated wire with an insulation film having voids connected in this way (hereinafter, these connected voids are also collectively referred to as "connected part") is bent or stretched to form a spiral shape to be processed into a coil of a motor, a force applied in a tensile direction during bending or stretching may cause a crack (hereinafter, also referred to as "film crack") along the thickness direction starting from the connected part. And there has been a possibility that insulating properties of the insulation film are degraded by the generated film crack.

An object of the present disclosure is to provide an insulated wire inhibiting occurrence of a partial discharge and a film crack even when the insulated wire is used in a coil of a motor used in high voltage drive and/or inverter drive.

One embodiment of the present disclosure is an insulated wire including: a conductor formed into a long shape; and an insulation film formed by stacking one or more of insulating layers covering a circumference of the conductor. The insulating layer has a porous region and a resin region. The porous region is formed of a resin and multiple voids. The resin region is formed of a resin. In the insulating layer, a boundary surface is not provided between a first boundary surface located on a radially inner side and a second boundary surface located on a radially outer side, and the porous region and the resin region are arranged in this order along a direction from the first boundary surface toward the second boundary surface.

In such a configuration, the insulating layer included in the insulation film has the porous region having the voids. Thus, the relative permittivity can be lowered and a partial discharge inception voltage can be easily increased in comparison with an insulation film that does not have an insulating layer having voids.

In the insulating layer, the resin region is arranged on the radially outer side than the porous region. In such a configuration, in the insulating layer, the resin region is provided in a region that is away from the conductor and that is more subject to a force in a tensile direction caused by bending or stretching, and the porous region is provided in a region that is near the conductor and that is less subject to the force in the tensile direction caused by bending or stretching. Therefore, even if the force is applied in the tensile direction due to bending or stretching, it is possible to inhibit the occurrence of the film crack starting from the connected part.

BRIEF DESCRIPTION OF THE DRAWINGS

An example embodiment of the present disclosure will be described hereinafter by way of example with reference to the accompanying drawings, in which:

FIG. 6 is a table showing measurement results of Examples and Comparative Examples of the present disclosure;

DETAILED DESCRIPTION OF ILLUSTRATIVE EMBODIMENTS

1. Configuration

An example will be described in which an insulated wire 1 of an embodiment of the present disclosure is, for example, an enamel insulated wire used in a coil for a motor or the like.

Figure 1:
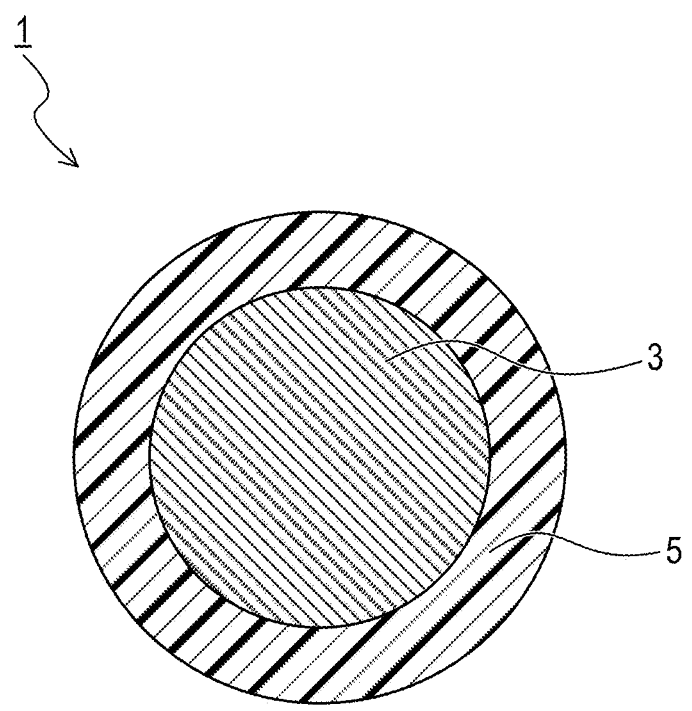
FIG. 1 is a sectional view showing a schematic cross-section orthogonal to a longitudinal direction of the insulated wire in an embodiment of the present disclosure.

FIG. 1 is a sectional view showing a schematic cross-section orthogonal to a longitudinal direction of the insulated wire 1.

As shown in FIG. 1, the insulated wire 1 includes a conductor 3 having a shape extended to be long and an insulation film 5 covering a peripheral surface of the conductor 3. In this embodiment, a description will be made of an example in which the conductor 3 has a circular cross-sectional shape.

In this example, the conductor 3 is the one used as a commonly used metal conducting wire. Examples of the metal used for the conductor 3 may include copper, an alloy containing copper, aluminum, or an alloy containing aluminum. For example, low oxygen copper with an oxygen content of 30 ppm or less or oxygen free copper may be used as the conductor 3.

The conductor 3 of the present embodiment will be described in an example in which a round copper wire having a diameter of 0.8 mm is used.

The insulation film 5 covers the peripheral surface of the conductor 3, and inhibits conduction between an object on an outer side of the insulation film 5 and the conductor 3 on an inner side of the insulation film 5 due to contact or the like.

Here, in a cross section orthogonal to the longitudinal direction of the conductor 3, "outer side" means a side on which the insulation film 5 is located relative to the conductor 3 along a radial direction of the conductor 3. In the cross section orthogonal to the longitudinal direction of the conductor 3, "inner side" means, as opposed to the outer side, a side on which the conductor 3 is located relative to the insulation film 5 along the radial direction of the conductor 3.

The insulation film 5 will be described in an example in which a thermosetting resin is used as a material. Examples of the thermosetting resin to be used may include polyimide and polyamide-imide.

In this embodiment, a description will be made of an example in which polyimide is used as the thermosetting resin for the insulation film 5.

The insulation film 5 includes one insulating layer 51 formed by applying insulating paint containing the thermosetting resin around the conductor 3 one time to form one coating film layer, and by burning (hardening) the coating film layer one time. Alternatively, the insulation film 5 has a layered structure of multiple insulating layers 51 made of the same type of the insulating paint by repeating the above-described process of applying and burning the insulating paint multiple times. One insulating layer 51 is formed to have a thickness of 1 μm or more and less than 10 μm (for example, about 3 μm). Since the multiple insulating layers 51 are stacked, boundary surfaces are formed between the inner sides and the outer sides of the adjacent insulating layers 51 where the adjacent insulating layers 51 are in contact with each other. The insulating layer 51 does not have a boundary surface of the insulating layer 51 in an inside thereof. The boundary surface of the insulating layer 51 as used herein means, for example, a surface that serves as a boundary between a layer of the insulating layer 51 and the other. Specifically, the boundary surface of the insulating layer 51 may be a layer between the insulating layers 51 radially adjacent to each other, a boundary between the insulating layer 51 and a gaseous layer, e.g., an air layer, or the like. Hereinafter, in each of the multiple insulating layers 51, a boundary surface located on the radially inner side is referred to as "first boundary surface", and a boundary surface located on the radially outer side is referred to as "second boundary surface".

Figure 2:
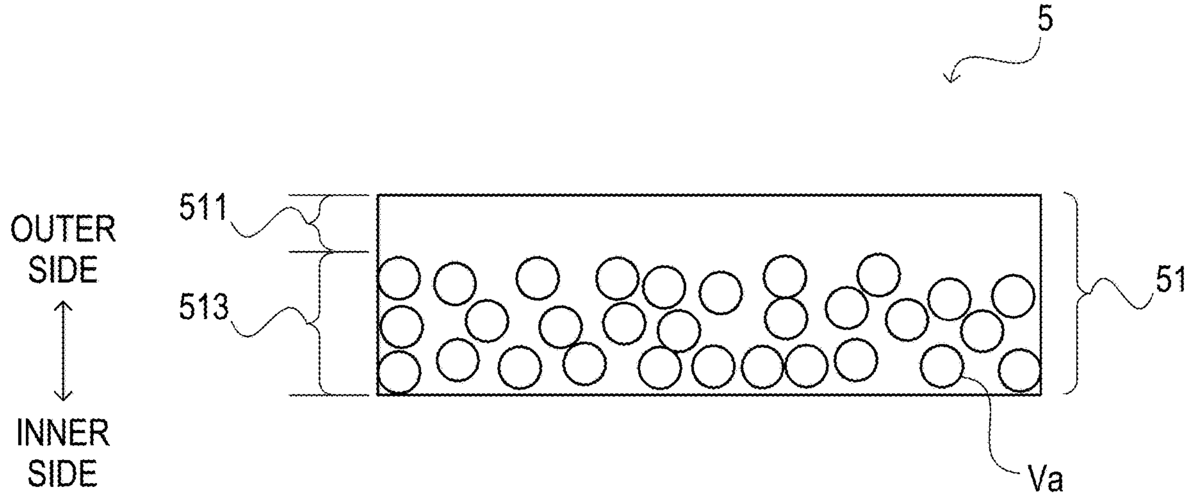
FIG. 2 is a sectional view schematically showing an inside of one insulating layer in the embodiment of the present disclosure.

FIG. 2 is a sectional view schematically showing an inside of one insulating layer 51. FIG. 2 is a sectional view in the cross section orthogonal to the longitudinal direction of the insulated wire 1. In FIG. 2, the upper side of the sheet corresponds to the outer side of the insulated wire 1, and the lower side of the sheet corresponds to the inner side of the insulated wire 1. The same is applied to FIG. 3 to FIG. 5 and FIG. 7 to FIG. 8, and the upper side of the sheet corresponds to the outer side of the insulated wire 1, and the lower side of the sheet corresponds to the inner side of the insulated wire 1. In FIG. 2, FIG. 3, FIG. 7 and FIG. 8, upper and lower surfaces of the insulating layer 51 are illustrated as being flat for the sake of explanation; however, the insulating layer 51 may be curved along the shape of the peripheral surface of the conductor 3.

As shown in FIG. 2, the insulating layer 51 has multiple voids Va in an inside thereof. Hereinafter, in the insulating layer 51, a region that does not have voids Va and that is formed of a resin is referred to as a resin region 511, and a region including a resin and the multiple voids Va is referred to as a porous region 513. That is, in the present embodiment, the resin region 511 is a non-porous region that does not have the voids Va. In this embodiment, the resin forming the porous region 513 is the same as the resin forming the resin region 511.

In this embodiment, an example will be described in which a size of the void Va included in the porous region 513 is 0.1 μm or more and 2 μm or less. The sectional shape of the void Va is, for example, formed into an oval shape or a circular shape.

In the insulating layer 51, the resin region 511 is located closer to the outer side of the insulating layer 51, and the porous region 513 is located closer to the inner side of the insulating layer 51. In other words, the resin region 511 is located in a region away from the conductor 3 in the thickness direction (i.e., in the radial direction) of the insulating layer 51, and the porous region 513 is located in a region near the conductor 3 in the thickness direction of the insulating layer 51. In the insulating layer 51, a surface on the inner side of the porous region 513 is the first boundary surface, and a surface on the outer side of the resin region 511 is the second boundary surface.

The resin region 511 included in one insulating layer 51 has a thickness of 5% or more and 70% or less of the thickness of the insulating layer 51.

Figure 3:
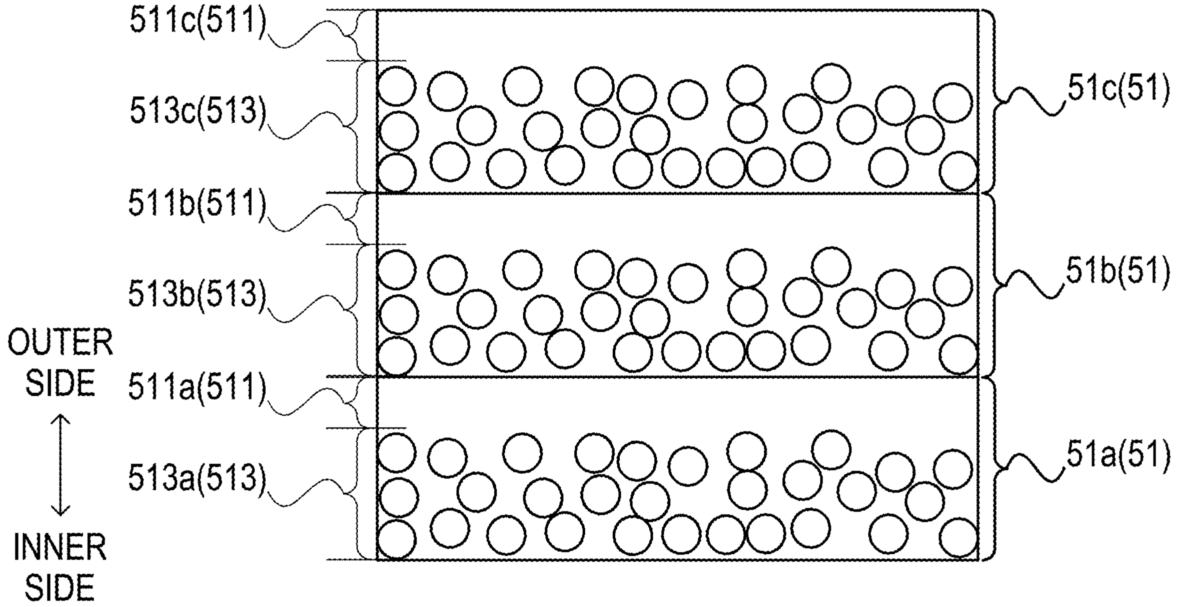
FIG. 3 is a sectional view schematically showing a layered structure of the insulating layers in the insulation film in the embodiment of the present disclosure.

FIG. 3 is a schematic cross-sectional view showing a layered structure of the insulating layers 51 in the insulation film 5.

As shown in FIG. 3, in each of the multiple insulating layers 51 forming the insulation film 5, a region on the outer side of the insulating layer 51 is the resin region 511, and a region on the inner side of the insulating layer 51 is the porous region 513. That is, in the stacked multiple insulating layers 51, the resin regions 511 and the porous regions 513 are arranged to be alternately next to each other along the radial direction of the insulated wire 1. Specifically, as shown in FIG. 3, an example will be described in which an insulating layer 51*a*, an insulating layer 51*b*, and an insulating layer 51*c* are stacked sequentially in this order from the inner side of the insulation film 5. Hereinafter, the resin regions 511 of the insulating layers 51*a*, 51*b*, 51*c* are also respectively referred to as resin regions 511*a*, 511*b*, 511*c*, and the porous regions 513 of the insulating layers 51*a*, 51*b*, 51*c* are also respectively referred to as porous regions 513*a*, 513*b*, 513*c*.

Between the insulating layer 51*a* located on the inner side and the insulating layer 51*b* adjacent to the insulating layer 51*a*, the resin region 511*a* of the insulating layer 51*a* and the porous region 513*b* of the insulating layer 51*b* are adjacent to each other. Similarly, between the insulating layer 51*b* and the insulating layer 51*c* adjacent to the insulating layer 51*b*, the resin region 511*b* and the porous region 513*c* are adjacent to each other.

In the insulation film 5, the outer surface of the insulating layer 51 located on the outermost side is the surface of the resin region 511 (the second boundary surface).

Figure 4:
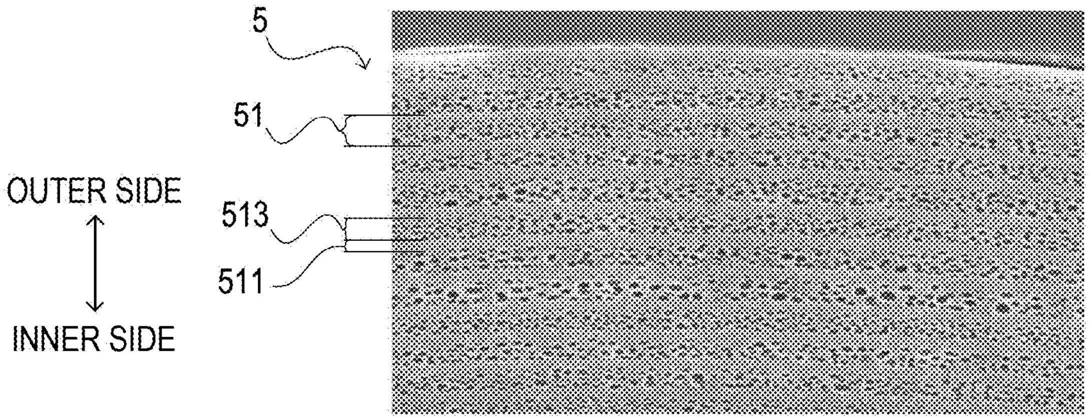
FIG. 4 is a figure showing a cross-sectional image of the insulation film taken with Scanning Electron Microscope (SEM)
Figure 5:
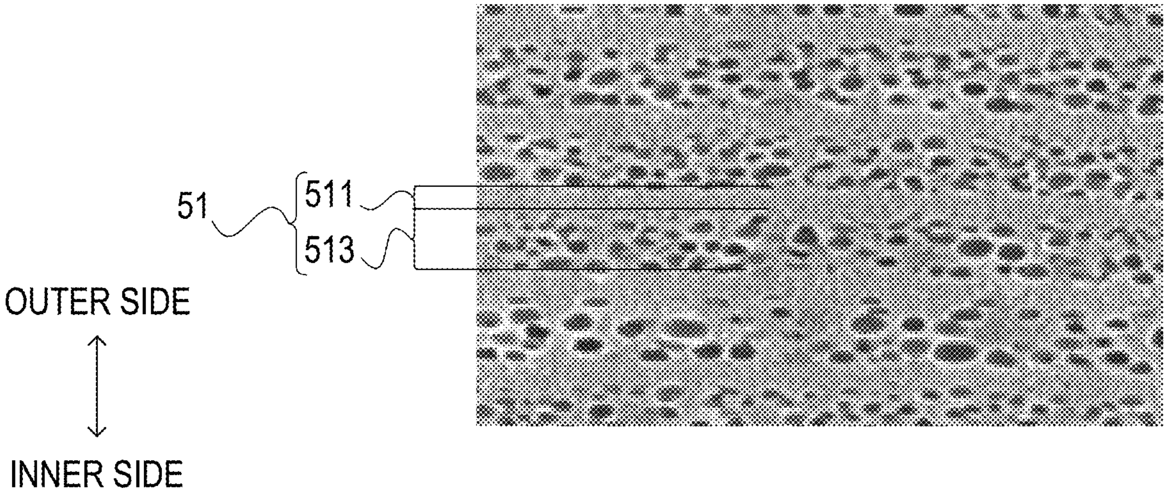
FIG. 5 is a figure showing an enlarged cross-sectional image of the insulation film taken with SEM.

FIG. 4 shows a sectional image of the insulating layer 51 taken with SEM. FIG. 5 shows an enlarged image of the insulating layers 51. The enlarged image shown in FIG. 4 is taken with SEM with a magnification of 2000 times. The term "SEM" as used herein is the abbreviation of a Scanning Electron Microscope.

As shown in FIG. 4 and FIG. 5, in the insulating layer 51 taken with SEM, a border is not observed between the resin region 511 and the porous region 513.

<Materials of Insulation Film>

An example will be described in which the polyimide forming the insulation film 5 is manufactured by polymerizing diamine and tetracarboxylic dianhydride, and by imidizing an obtained polyamide acid.

Examples of the diamine to be used may include 1,4-bis (4-aminophenoxy) benzene (TPE-Q), 1,3-bis (4-aminophenoxy) benzene (TPE-R), 1,3-bis (3-aminophenoxy) benzene (APB), 4,4'-bis (4-aminophenoxy) biphenyl (BODA), and 4,4'-diaminodiphenyl ether (ODA).

Examples of the tetracarboxylic dianhydride to be used may include, 3,3',4,4'-benzophenone tetracarboxylic dianhydride (BTDA), 3,3',4,4'-diphenylsulphon tetracarboxylic dianhydride (DSDA), 4,4'-oxydiphthalic dianhydride (ODPA), 4,4'-(2,2-hexafluoro isopropylidene) diphthalic anhydride (6FDA), pyromellitic dianhydride (PMDA), and 3,3',4,4'-biphenyl tetracarboxylic dianhydride (BPDA).

The polyimide that is a polymeric material used for the insulation film 5 may be the one in which polymer terminals are capped.

Examples of the material to be used for the capping may include a compound containing acid anhydride or a compound containing amino acid.

Examples of the compound containing the acid anhydride used for the capping may include phthalic anhydride, 4-methyl phthalic anhydride, 3-methyl phthalic anhydride, 1,2-naphthalic anhydride maleic anhydride, 2,3-naphthalenedicarboxylic anhydride, various fluorinated phthalic anhydrides, various brominated phthalic anhydrides, various chlorinated phthalic anhydrides, 2,3-anthracenedicarboxylic anhydride, 4-ethynyl phthalic anhydride, and 4-phenyl-ethynyl phthalic anhydride.

For the compound containing an amino group used for the capping, a compound including one amino group may be used.

Synthesis of the polyimide used for the insulation film 5 will be described in an example in which the polyimide is synthesized in a state that materials are dissolved in a solvent. After the synthesis of the polyimide, in this example, polyimide dissolved in the solvent is used as an insulating paint.

Examples of the solvent to be used for the synthesis of the polyimide used for the insulation film 5 and the paint may include a solvent of polar aprotic solvents, such as N-methylpyrrolidone (NMP), N,N-dimethylacetamide (DMAc) and N,N-dimethylsulfoxide (DMF), and a solvent, such as γ-butyrolactone, dimethyl imidazolidinone (DMI), cyclohexanone, methylcyclohexanone, and a hydrocarbon system. Among these solvents, two or more solvents may be used together.

In this embodiment, in the polyimide used for the insulation film 5, a blending molar ratio of an acid anhydride component to a diamine component is 100:100. The blending molar ratio of the acid anhydride component to the diamine component is not limited to 100:100, and the ratio may be different to a degree that the flexibility of the insulation film 5 or the like is not impaired. For example, the diamine component may be excessively blended to the acid anhydride component.

With the polyimide blended at such a molar ratio, the molecular weight can be reduced, and the viscosity of the paint can be reduced. As a result, the workability of the operation to apply the insulating paint to form the insulation film 5, which will be described below, can be improved. For example, the blending molar ratio of the acid anhydride component to the diamine component may be 100:100.1 or more and 100:100.7 or less.

Conversely, the acid anhydride component may be excessively blended with the diamine component.

The insulating paint for forming the insulation film 5 is synthesized at a temperature that does not impair properties of the polyamic acid. The specific temperature may be, for example, 0° C. to 100° C. After the synthesis of the insulating paint for forming the insulation film 5, the resultant may be stirred in a warmed state at a temperature of, for example, 50° C. to 100° C. to adjust the viscosity of the insulating paint for forming the insulation film 5.

The voids Vain the porous region 513 of the insulation film 5 in the present embodiment are formed by using a foaming agent.

2. Actions

<Manufacturing Processes of Insulated Wire>

A manufacturing process of the insulated wire 1 will be described.

The conductor 3 of the present embodiment will be described in an example in which a round copper wire having a diameter of 0.8 mm is used. An insulating paint is applied to the conductor 3 using a dice having a gap of 25 μm or more and 30 μm or less, and then the resultant is burned in a furnace having a temperature gradient of 300° C. to 400° C. to form the insulating layer 51. The insulating layer 51 is repeatedly stacked so that the insulation film 5, which is formed by the application and burning of the insulating paint, has a thickness of 40 μm. In this embodiment, a description will be made of an example in which one layer of the insulating layer 51 having the thickness of about 3 μm is formed by one time of the application and one time of the burning.

<Synthetic Method of Insulating Paint>

The synthesis of the insulating paint used for the insulation film 5 of the insulated wire 1 was conducted in the following steps. Insulated wires 1 produced in different conditions are described as Examples 1-3, and insulated wires produced for comparison with the insulated wires 1 in Examples 1-3 are described as Comparative Examples 1-6.

EXAMPLE 1

The same amounts of substance of 4,4'-diaminodiphenyl ether and 1,3-bis (4-aminophenoxy) benzene, which are raw materials of the diamine (hereinafter, also referred to as "diamine raw materials"), are dissolved in DMAc at a molar ratio of 1.00 mol of 1,3-bis (4-aminophenoxy) benzene to 1.00 mol of 4,4'-diaminodiphenyl ether.

Then, the same amounts of substance of pyromellitic dianhydride and diphenyl-3,3',4,4'-tetracarboxylic dianhydride (s-BPDA), which are raw materials of the acid dianhydride (hereinafter, also referred to as "acid dianhydride raw materials"), are dissolved at a molar ratio of 1.03 mol of the acid dianhydride raw materials to 1.00 mol of the diamine raw materials.

The resultant is stirred for 12 hours at room temperature under nitrogen atmosphere to obtain a polyimide paint. The polyimide paint is insulating paint in which a polyimide precursor (polyamic acid) formed of the diamine raw materials and the acid dianhydride raw materials is dissolved or dispersed in the solvent.

Hereinafter, the polyimide paint obtained by this method is also referred to as "insulating paint P1_x_" (Paint 1 shown in FIG. 6).

As a foaming agent, a compound (high boiling point solvent) that is dissolved in the main solvent of DMAc and that has a boiling point of 210° C. or higher is added to the insulating paint P1_x_. The paint in which the foaming agent is added to the insulating paint P1_x_ is also referred to as "insulating paint P1".

EXAMPLE 2

4,4'-diaminodiphenyl ether that is the diamine raw material is dissolved in DMAc. Then, 1.05 mol of pyromellitic dianhydride that is the acid dianhydride raw material is dissolved relative to 1.00 mol of the diamine raw material. Then, the solution is stirred for 12 hours at room temperature under nitrogen atmosphere to obtain a polyimide paint.

Hereinafter, the polyimide paint obtained by this method is also referred to as "insulating paint P2_x_".

As a foaming agent, a compound (high boiling point solvent) that is dissolved in the main solvent of DMAc and that has a boiling point of 210° C. or higher is added to the insulating paint P2_x_. The paint in which the foaming agent is added to the insulating paint P2_x_ (Paint 2 shown in FIG. 6) is also referred to as "insulating paint P2".

EXAMPLE 3

Trimellitic anhydride and 4,4'-diphenylmethane diisocyanate are dissolved in NMP. In NMP, 1.02 mol of the 4,4'-diphenylmethane diisocyanate is dissolved relative to 1.00 mol of trimellitic anhydride. Then, the solution is stirred for 4 hours at 160° C. under nitrogen atmosphere to obtain a polyamide-imide paint. The polyamide-imide paint is an insulating paint in which polyamide-imide is dissolved or dispersed in the solvent.

Hereinafter, the polyamide-imide paint obtained by this method is also referred to as "insulating paint P3_x_" (Paint 3 shown in FIG. 6).

As a foaming agent, a compound (high boiling point solvent) that is dissolved in the main solvent of NMP and that has a boiling point of 210° C. or higher is added to the insulating paint P3_x_. The paint in which the foaming agent is added to the insulating paint P3_x_ is also referred to as "insulating paint P3".

Comparative Example 1

In Comparative Example 1, the foaming agent is not added to the insulating paint P1_x_, and the insulating paint P1_x_ is used as an insulating paint.

Comparative Example 2

In Comparative Example 2, degradable polymer fine particles having a particle diameter of approximately 1.0 μm are added as a foaming agent to the insulating paint P1_x_, and an obtained insulating paint P1 is used as an insulating paint.

Comparative Example 3

In Comparative Example 3, the foaming agent is not added to the insulating paint P2_x_, and the insulating paint P2_x_ is used as an insulating paint.

Comparative Example 4

In Comparative Example 4, degradable polymer fine particles having a particle diameter of approximately 1.0 μm are added as a foaming agent to the insulating paint P2_x_, and an obtained insulating paint P2 is used as an insulating paint.

Comparative Example 5

In Comparative Example 5, the foaming agent is not added to the insulating paint P3_x_, and the insulating paint P3_x_ is used as an insulating paint.

Comparative Example 6

In Comparative Example 6, degradable polymer fine particles having a particle diameter of approximately 1.0 μm are added as a foaming agent to the insulating paint P3_x_, and an obtained insulating paint P3 is used as an insulating paint.

<Calculation Method of Ratio of Thickness of Resin Region>

Calculations are made based on an image of a cross section of the insulated wire 1 taken with SEM to obtain a thickness of the resin region 511, a thickness of the porous region 513, a ratio of the thickness of the resin region 511 to a thickness of the insulating layer 51, and a ratio of the thickness of the porous region 513 to the thickness of the insulating layer 51.

Specifically, the insulation film 5 is first cut in a direction orthogonal to the longitudinal direction of the enameled wire, and the cut surface is polished. Then, an image of the polished cut surface is taken with SEM, and calculations are made based on the image taken with SEM.

When the image is taken with SEM, the magnification is appropriately adjusted in a range of, for example, 2000 times to 5000 times.

In this embodiment, the ratio of the thickness of the resin region 511 and the ratio of the thickness of the porous region 513 will be described in an example in which these ratios are calculated relative to the thickness of the insulating layer 51.

The thickness of the resin region 511 is, in one insulating layer 51, a length along the thickness direction from a boundary surface (the second boundary surface) on the radially outer side of the insulating layer 51 to an outer border of a void Va located outermost in the radial direction of the insulating layer 51. The thickness of the porous region 513 is, in one insulating layer 51, a length along the thickness direction from the outer border of the void Va located outermost in the radial direction to a boundary surface (the first boundary surface) on the radially inner side of the insulating layer 51.

In this way, the thicknesses of the resin region 511 and the porous region 513 are measured, and thus, it is possible to easily measure the thicknesses even based on the SEM image in which a borderline between the resin region 511 and the porous region 513 is not observed.

The ratios of the thicknesses of the resin region 511 and the porous region 513 are not limited to those calculated by separately comparing each of the resin region 511 and the porous region 513 with the insulating layer 51. For example, when the ratio of the thickness of the resin region 511 to the insulating layer 51 is calculated, a remaining ratio of the thickness may be calculated as the ratio of the thickness of the porous region 513.

The thicknesses of the resin region 511 and the porous region 513 may be changed, for example, by adjusting the boiling point of the foaming agent or by adjusting an amount of addition of the foaming agent.

For example, when the foaming agent has a high boiling point, the ratio of the thickness of the resin region 511 is reduced. Specifically, when a foaming agent has a boiling point of approximately 290° C., the ratio of the thickness of the resin region 511 is about 10% or more and 20% or less. Conversely, when a foaming agent has a low boiling point, the thickness of the resin region 511 is increased. A preferable boiling point of the foaming agent to be used is, for example, 210° C. or higher and 350° C. or lower. If the amount of addition of the foaming agent is reduced, the thickness of the resin region 511 is increased. If the amount of addition of the foaming agent is increased, the thickness of the resin region 511 is reduced.

<Measurement Method of Porosity>

A porosity of the porous region 513 in the insulation film 5 of the insulated wire 1 was measured by an underwater substitution method. Specifically, the insulated wire 1 having a predetermined length of e.g. 1 m is put into water, and air in the voids Va is substituted with water. Specific gravities of the insulated wire 1, in which the air inside the voids Va is substituted for water, are measured before and after peeling off the insulation film 5. An insulated wire 1*x* that has the same length, that is formed of the same materials as the insulated wire 1 and that has an insulating layer 51*x* without voids Va is prepared, and specific gravities are measured before and after peeling the insulating layer 51*x*. A porosity is determined by comparing the specific gravities of the insulated wire 1 before and after peeling the insulation film 5 having the voids Va with the specific gravities of the insulated wire 1*x* before and after peeling the insulating layer 51*x* without the voids Va.

The porosity is calculated by the following formula: porosity (%)=$(\rho 1-\rho 2)/\rho 1\times 100$. Herein, "$\rho 1$" represents a specific gravity of the entire insulation film 5 without the voids Va, and "$\rho 2$" represents a specific gravity of the entire insulation film 5 with the voids Va.

The porosity to the entire insulation film 5 in the present embodiment will be described in an example in which the porosity is 2% or more and less than 25%.

<PDIV Measurement>

A twisted pair cable formed by the insulated wires 1 is used. A voltage of 50 Hz is boosted in a range of 10 V/s or higher and 30 V/s or lower at a temperature of 23° C. under humidity 50% atmosphere. The voltage at which a discharge of 50 pC occurs 50 times is defined as a partial discharge inception voltage (PDIV).

A targeted value of PDIV is 950 Vp when polyimide is used as a material of the insulation film 5, or 830 Vp when polyamide-imide is used as a material of the insulation film 5.

<Flexibility Test>

In the flexibility test, the flexibility of the insulated wire 1 is evaluated by simulating the insulated wire 1 after processed into a coil.

In Example 1, Example 2, and Comparative Example 1, in which the polyimide is used for the insulation film 5, the insulated wire 1 is extended by 30%, and then wound around its self-diameter for 50 turns. Then, the presence or absence of the occurrence of the film crack is inspected. A target of the film crack inspection is that a film clack is not observed.

In Example 1, Example 2, and Comparative Example 1 in which the polyamide-imide is used for the insulation film 5, the insulated wire 1 is extended by 30%, and then wound around its self-diameter for 50 turns. Then, the presence or absence of the occurrence of the film crack is inspected. A target of the film crack inspection is that a film clack is not observed. In FIG. 6, a wire without a film crack is indicated with a circle mark meaning "good" and a wire with a film crack is indicated with a cross mark meaning "bad".

<Measurement of Breakdown Voltage (BDV)>

A twisted pair cable formed by the insulated wires 1 is used. A voltage at 50 Hz is boosted from 0.0 V to 20.0 kV in air, and the voltage that causes insulation breakdown is defined as a breakdown voltage.

<Measurement Result of Examples and Comparative Examples>

FIG. 6 shows the measurement results of the insulated wires 1 in Examples 1-3 and the insulated wires of Comparative Examples 1-6.

As shown in Examples 1 and 2 in the table of FIG. 6, when the entire porosity is 20% or more, the PDIV satisfies the target PDIV of 950 Vp, which is the target value when the polyimide is used as a material of the insulation film 5.

The reason is considered that the voids Va in the porous region 513 can reduce the relative permittivity of the entire insulation film 5, and as a result, the partial discharge inception voltage (PDIV) of the insulation film 5 is likely to increase.

In Examples 1 and 2, while the PDIVs satisfy the target PDIV, the ratios of the thicknesses of the resin regions 511 to the thickness of the insulating layer 51 are 50% in Example 1 and 20% in Example 2, and the flexibility results are rated good. The results of the self-diameter winding after the 30% extension are also rated good, satisfying the target when the polyimide is used for the insulation film 5. The insulated wires in Examples 1 and 2 have the insulation films 5 with the porous regions 513, and the breakdown voltages (BDV) are 16 kV in Example 1 and 15 kV in Example 2. In Comparative Example 1 and Comparative Example 3, the insulated wires have the insulation films 5 that are formed of the same paint as Examples 1 and 2 and that have no voids Va, and the breakdown voltages (BDV) are 17 kV in Comparative Example 1 and 16 kV in Comparative Example 3. That is, the insulated wires 1 having the insulation films 5 with the porous regions 513 in Examples 1 and 2 can be evaluated to have almost the same level of the breakdown voltages (BDV) as those of the insulated wires having the insulation films 5 without voids Va.

On the other hand, in Comparative Example 2 and Comparative Example 4 without the resin region 511, a film crack is generated in the flexibility test. In Comparative Example 2 and Comparative Example 4 without the resin regions 511, the breakdown voltages are 6 kV in Comparative Example 2 and 7 kV in Comparative Example 4, and these breakdown voltages are lower than those of the insulated wires having the resin regions 511.

In the insulated wire 1 in Example 3, the polyamide-imide is used for the insulation film 5. In Example 3, the porosity is 20%. In Example 3, the PDIV is 850 Vp, satisfying the target PDIV of 830 Vp when the polyamide-imide is used for the insulation film 5.

The insulated wire 1 in Example 3 is evaluated as good according to a result of the flexibility test. That is, the result of the self-diameter winding after the 20% extension is evaluated as good, satisfying the target when the polyamide-imide is used for the insulation film 5. With respect to the breakdown voltage, the insulated wire of Comparative Example 5 with the insulation film 5 that is formed of the same material as Example 3 and that has no void Va has the breakdown voltage of 17 kV, whereas, the insulated wire 1 in Example 3 has the breakdown voltage of 15 kV. That is, in the insulated wire 1 in Example 3 having the voids Va, the breakdown voltage is evaluated as almost the same level as that of the insulated wire of Comparative Example 5 without the voids Va.

In Comparative Example 6, the porosity is lower than that of Example 3, and the ratio of the thickness of the resin region 511 is 2% relative to the thickness of the insulation film 5, and a film crack is generated in the flexibility test. In addition, the insulated wire 1 in Comparative Example 6 has a lower breakdown voltage.

<Estimated Mechanism that Insulation Film is Formed Around Peripheral Surface of Conductor>

A description will be made of an estimated mechanism that the insulation film 5 having the resin region 511 and the porous region 513 is formed around the peripheral surface of the conductor 3 in the insulated wire 1 of the present disclosure.

First, insulating paint to form the insulation film 5 is applied to the conductor 3. The film formed by applying the insulating paint is also referred to as a coating film. When burning of the conductor 3, to which the insulating paint has been applied and on which the coating film has been formed, is started, the main solvent of the insulating paint volatilizes. As the main solvent volatilizes, the amount of the main solvent decreases in the paint forming the coating film. While the main solvent volatilizes, phase separation occurs between the coating film and the foaming agent.

Here, in an inside of the coating film, the phase separation between the coating film and the foaming agent occurs due to the decrease of the main solvent, and the foaming agent is dispersed in the coating film. The foaming agent dispersed in the coating film volatilizes when the conductor 3 is further burned, and the voids Va are formed. The portion of the coating film in which the voids Va are formed becomes the porous region 513 of the insulation film 5.

On the other hand, on the outer side of the coating film, the foaming agent is easily released from the coating film before the phase separation. Thus, the foaming agent to be phase-separated from the coating film is almost nonexistent on the outer side of the coating film. Therefore, the voids Va are not formed on the outer side of the coating film. The portion on the outer side of the coating film without the voids Va becomes the resin region 511 of the insulation film 5.

A foaming agent having a boiling point that helps volatilization before the phase separation on the outer side of the coating film may be selected. A state of the phase separation on the outer side of the coating film may be adjusted so that the volatilization is likely to occur before the phase separation.

As described above, every time the insulating paint is applied and burned, the insulating layer 51 including the resin region 511 formed on the outer side and the porous region 513 formed on the inner side is formed.

The method for applying the insulating paint is not particularly limited as long as the resin region 511 and the porous region 513 are formed in one insulating layer 51, and a conventional coating process may be used. Specifically, the insulating paint is applied to the conductor 3, and the conductor 3 is burned in a furnace at a temperature of, for example, 350° C. or higher and 500° C. or lower for 1-2 minutes to form one insulating layer 51. By repeating this coating and burning process, the insulation film 5 having the multiple insulating layers 51 is formed around the peripheral surface of the conductor 3. By adjusting the number of times to repeat the process of application and burning, the thickness of the insulation film 5 can be adjusted.

The coating conditions may be adjusted in accordance with a type of the foaming agent, a temperature of the heating furnace, and a coating speed.

The ratio of the thickness of the resin region 511 in the insulating layer 51 may be adjusted in accordance with the type of the foaming agent and the coating conditions.

Multiple insulating layers 51 are stacked by repeating the process of application and burning of the insulating paint.

With this configuration, only one kind of insulating paint is required to form the insulation film 5 having the multiple insulating layers 51, whereby the insulation film 5 can be easily formed in comparison with a case where multiple kinds of insulating paints are prepared. Since it is not necessary to change a coating device and coating conditions in accordance with the preparation of the multiple types of insulating paints, the painting process becomes simple.

Examples of the foaming agent to be used may include ethyl glycols, propyl glycols, triglyme, and tetraglyme. The triglyme is also referred to as triethylene glycol dimethyl ether and the tetraglyme is also referred to as the tetraethylene glycol dimethyl ether.

<Film Crack Prevention Action>

In the insulation film 5 of the insulated wire 1 in the present embodiment, the resin region 511 is located on an outer side than the porous region 513 in each of the stacked multiple insulating layers 51.

Figure 7:
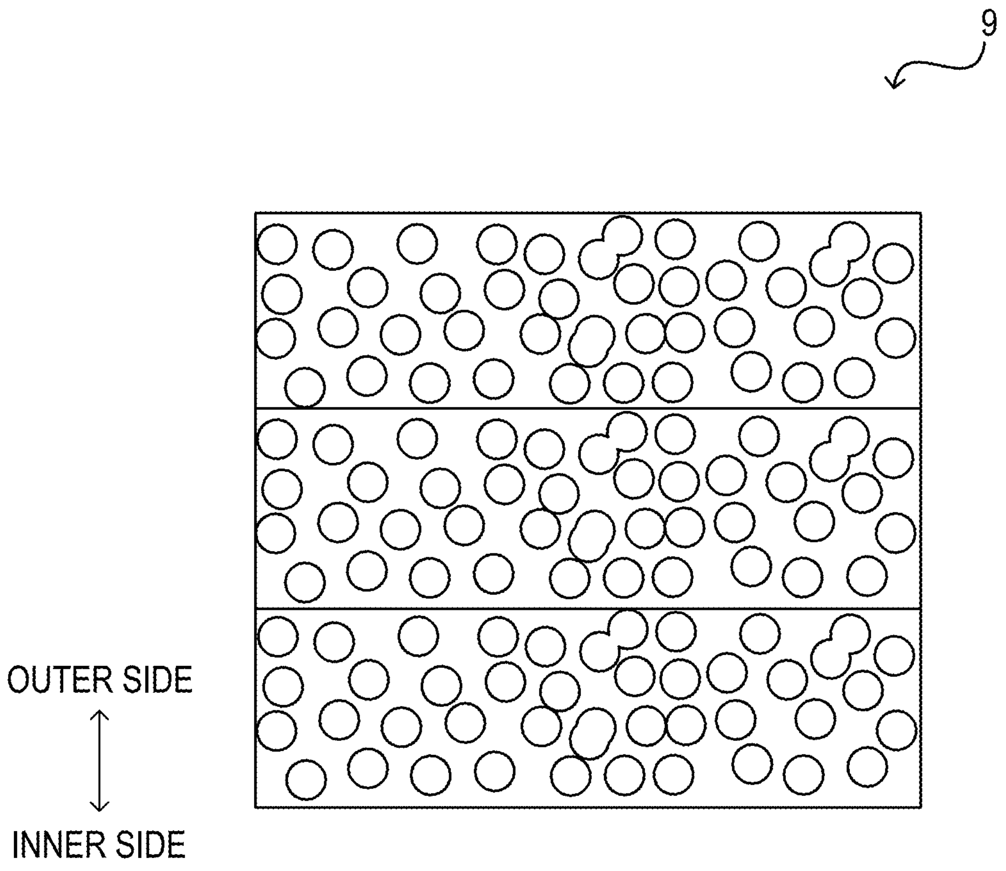
FIG. 7 PRIOR ART
FIG. 7 is a figure schematically showing an example of a layered structure of insulating layers in an insulation film in a prior art.
Figure 8:
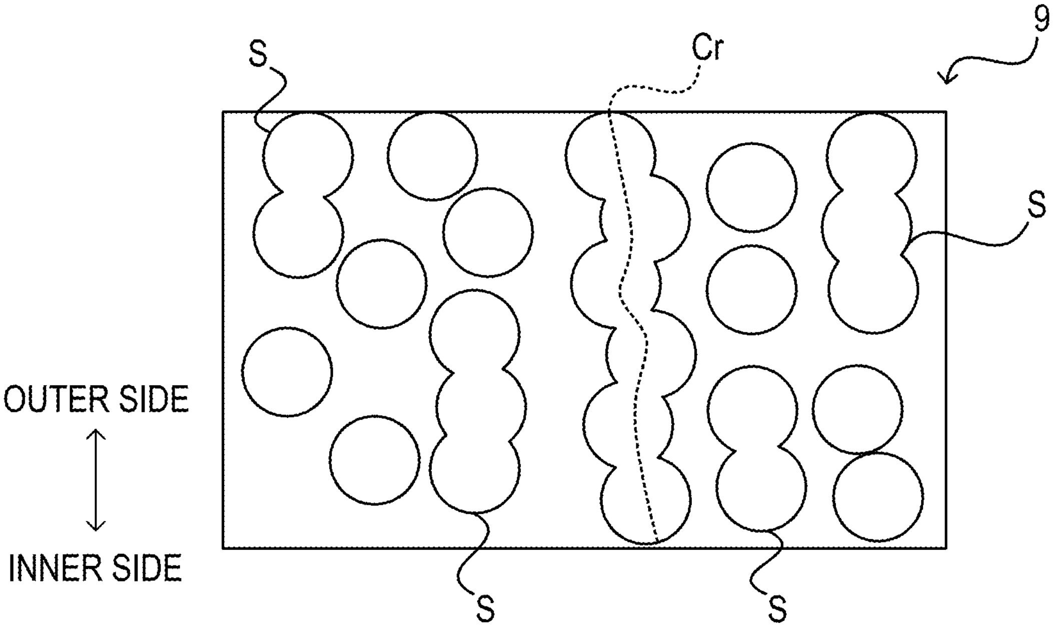
FIG. 8 PRIOR ART
FIG. 8 is a figure schematically showing a connected part formed of connected voids, and showing a film crack in the prior art.

In comparison to this, FIG. 7 and FIG. 8 show schematic views of an insulation film 9 having a region with voids in the entire area of an insulating layer.

As shown in FIG. 7 and FIG. 8, as the number of voids Va increases in the insulating layer, the voids Va are more connected with each other. Hereinafter, the connected voids Va are also referred to as "connected part S". Here, in the connected part of the voids Va, the multiple voids Va are combined in the insulating layer and form a common internal space among the multiple voids Va.

In the insulating layer having the connected part S as shown in FIG. 8, a film crack Cr is easily generated with the connected part S serving as a starting point when the insulated wire receives force due to bending or stretching.

On the other hand, in the insulation film 5 of the insulated wire 1 in the present embodiment, a region on the outer side of the insulating layer 51 that is more subject to a force in a tensile direction caused by bending or stretching is the resin region 511 formed of a resin. Thus, in the resin region 511 formed of a resin, the connected part of the connected voids Va is less likely to be generated. Therefore, the film crack starting from the connected part is less likely to occur.

<Measurement Results of Other Examples>

Table 1 shows measurement results of insulated wires 1 of Examples 4-6 which are produced by a method similar to that of Example 2 and which are varied in the ratio of the thickness of the resin region 511 to the thickness of the insulating layer 51.

EXAMPLES 4-6

An insulating paint used in Examples 4-6 comprises the insulating paint P2*x* added with a compound (high boiling point solvent) as a foaming agent that is dissolved in the main solvent of DMAc and that has a boiling point of 210° C. or higher.

TABLE 1

| Item | Example 4 | Example 5 | Example 6 |
|---|---|---|---|
| Paint | Paint 2 | Paint 2 | Paint 2 |
| Foamed/ Unfoamed | Foamed | Foamed | Foamed |
| Ratio of Thickness of Resin Region (%) | 25 | 10 | 6 |
| Porosity (%) | 25 | 31 | 36 |
| PDIV (Vp) | 1010 | 1020 | 1040 |
| Flexibility | ○ | ○ | ○ |
| Breakdown Voltage (kV) | 14 | 10 | 9 |

In the insulated wires 1 of Examples 4-6, as shown in Table 1, the ratios of the thicknesses of the resin regions 511 in the insulating layer 51 are 6% to 25%, and the PDIV values satisfy 950 Vp, which is the target PDIV when the polyimide is used as a material of the insulation film 5. As is the case of Examples 1-2, the reason is considered that with the ratios of the porous regions 513, the voids Va can contribute to reduction of the relative permittivity of the entire insulation film 5, and thus, the partial discharge inception voltage (PDIV) of the insulation film 5 can be increased. Moreover, in the insulated wires 1 of Examples 4-6, the film crack is not observed in the flexibility test.

<Test for Tolerance to Automatic Transmission Fluid (ATF)>

In the test for tolerance to ATF, the insulated wire 1 of Example 2 is used as a sample 1 and is evaluated by a method described below. Table 2 shows the measurement results.

In the test for tolerance to ATF, the sample 1 formed of the insulated wire 1 having a length of 25 cm and a roughly circular cross sectional shape is firstly immersed in automatic transmission fluid (ATF) having a water content of 0.2 wt %. At this time, the entire part of the sample 1 is immersed in the ATF. Then, the sample 1 in this state is put into a thermostatic bath of 150° C. for 1,000 hours. After 1,000 hours, the sample 1 is taken out of the thermostatic bath, and the ATF adhered to the sample 1 is wiped off. The sample 1 from which the ATF has been removed is observed using a microscope of magnification of about 5 times to inspect whether there is a crack on the surface of the insulation film. Also, in order to measure a relative permittivity of the sample 1, electrodes are formed on the surface of the sample 1 taken out from the thermostatic bath. A method for forming the electrode is that silver paste is firstly applied on the insulation film in 100 mm in length as a main electrode. Then, two guard electrodes are formed by applying the silver paste in 10 mm in width at a location 10 mm apart from this main electrode toward the ends of the sample 1. It is recommended to use DOTITE D-550 manufactured by Fujikura Kasei Co., Ltd as the silver paste and to use a 10 mm wide tape for masking when applying the paste. The relative permittivity after the immersion in the ATF is measured by a capacitance method between this silver paste and the conductor of the sample 1. In order to minimize the effect of absorbed water on the relative permittivity, the relative permittivity is measured after the sample 1 is heated in the thermostatic bath at 150° C. for one hour to vaporize the moisture. The frequency used at the time of measuring the relative permittivity is 1 kHz. In Table 2, if a crack is not confirmed on the surface of the insulation film after the test for tolerance to ATF and the relative permittivity is not changed from the relative permittivity before the test for tolerance to ATF, the sample is indicated with a circle mark meaning "good".

<Heat Resistance Test>

In the heat resistance test, the insulated wire 1 of Example 5 is used as a sample 2, and the insulated wire 1 of Example 6 is used as a sample 3, and they are evaluated by a method described below. Table 2 shows the measurement results.

In the heat resistance test, the samples 2 and 3 formed of the insulated wires 1 each having a length of 25 cm and a roughly circular cross-sectional shape are firstly immersed in ATF. At this time, the entire part of each of the samples 2 and 3 is immersed in the ATF. Then, the samples 2 and 3 are immediately taken out from the ATF and the ATF adhered to the samples 2 and 3 is wiped off, and the samples 2 and 3 are put into a thermostatic bath of 200° C. for 1,000 hours. After 1,000 hours, the samples 2 and 3 are taken out from the thermostatic bath. The samples 2 and 3 taken out from the thermostatic bath are observed using a microscope of magnification of about 5 times to inspect whether there is a crack on the surface of the insulation film. In order to measure relative permittivity of the samples 2 and 3, electrodes are formed on the surfaces of the samples 2 and 3 taken out from the thermostatic bath. The methods for forming the electrodes and for measuring the relative permittivity are similar to those described in the test for tolerance to ATF. In Table 2, if a crack is not confirmed on the surface of the insulation film after the heat resistance test and the relative permittivity is not changed from the one before the heat resistance test, the sample is indicated with a circle mark meaning "good".

TABLE 2

| Item | Sample 1 | Sample 2 | Sample 3 |
|---|---|---|---|
| Ratio of Thickness of Resin Region (%) | 20 | 10 | 6 |
| Porosity (%) | 20 | 31 | 36 |
| ATF Tolerance | ○ | — | — |
| Heat Resistance | — | ○ | ○ |

In the sample 1 using the insulated wire 1 of Example 2, as shown in Table 2, a crack and the like are not confirmed on the surface of the insulation film after the test for tolerance to ATF, and the relative permittivity is unchanged before and after the test for tolerance to ATF. In the samples 2 and 3 using the insulated wires 1 of Examples 5 and 6, as shown in Table 2, a crack and the like are not confirmed on the surfaces of the insulation films after the heat resistance test, and the relative permittivity is unchanged before and after the heat resistance test. The reason for this can be considered that in the insulated wire 1 of the present embodiment, the outermost surface of the insulation film 5 is the resin region 511 that does not have the voids Va, and the surface of the insulation film 5 does not have the voids, whereby the ATF does not enter the inside of the insulation film 5 and the relative permittivity is inhibited from increasing. That is, the insulated wire 1 of the present embodiment has a good tolerance as well when immersed in the ATF.

3. Effects (1) The insulated wire 1 of the above embodiment includes the conductor 3 formed into a long shape, and the insulation film 5 formed by stacking at least one insulating layer 51 covering the circumference of the conductor 3. The insulating layer 51 includes the porous region 513 and the resin region 511. The porous region 513 is formed of a resin and multiple voids Va included in the resin. The resin region 511 is formed of the resin. In the insulating layer 51, a boundary surface is not provided between the first boundary surface located on the radially inner side and the second boundary surface located on the radially outer side, and the porous region 513 and the resin region 511 are arranged in this order from the first boundary surface toward the second boundary surface.

In such a configuration, the insulating layer 51 included in the insulation film 5 has the porous region 513 having the voids Va. Therefore, the relative permittivity can be reduced in comparison with the insulation film 5 that does not have the insulating layer 51 having the voids Va, and the partial discharge inception voltage is easily increased.

(2) In the insulating layer 51, the resin region 511 is arranged to be located on an outer side than the porous region 513 along the radial direction.

In such a configuration, in the insulating layer 51, the resin region 511 is provided in a region that is away from the conductor 3 and that is more subject to the force in the tensile direction caused by bending or stretching, and the porous region 513 is provided in a region that is near the conductor 3 and that is less subject to the force in the tensile direction caused by bending or stretching. Therefore, even if the force is applied in the tensile direction due to bending or stretching, it is possible to inhibit the occurrence of the film crack Cr starting from the connected part S.

(3) In this embodiment, the polyimide is used as a thermosetting resin used for a material of the insulation film 5.

In such a configuration, the insulation film 5 has mechanical characteristics, low relative permittivity, and heat resistance of the polyimide.

(4) In this embodiment, the outermost layer of the insulation film 5 is formed of the resin region 511 that does not include the multiple voids, and the surface of the insulation film 5 does not have the void.

With such a configuration, even if the insulation film 5 having the voids is in contact with the ATF (Automatic Transmission Fluid), it is possible to inhibit the ATF from entering an inside of the insulation film 5. Therefore, in the insulated wire 1 of the present embodiment, the relative permittivity of the insulation film 5 is less likely to increase even if the insulation film 5 is in contact with the ATF. The crack (film crack) caused by the ATF can be less likely to occur in the insulation film 5.

4. Other Embodiments (1) In the insulated wire 1 of the embodiment, the ratio of the thickness of the resin region 511 is 5% or more and 70% or less of the total thickness of the insulation film 5.

The ratio of the thickness of the resin region 511 may be 20% or more of the total thickness of the insulation film 5.

With such a ratio of the thickness, the ratio of the resin region 511 is relatively large with respect to the ratio of the porous region 513 having the voids Va, which is preferable to inhibit the film cracks.

(2) The ratio of the thickness of the resin region 511 may be 50% or less of the total thickness of the insulation film 5.

With such a ratio of the thickness, a ratio of the multiple voids Va in the porous region 513 in the entire insulation film 5 is easily increased, and the relative permittivity of the insulation film 5 is easily lowered. Therefore, the partial discharge inception voltage (PDIV) of the insulation film 5 can be easily improved. Thus, it is easy to inhibit the occurrence of the partial discharge in the insulated wire 1.

(3) In the embodiment, the ratio of the thickness of the resin region 511 to the insulating layer 51 is 5% or more and 70% or less. The ratio of the thickness of the porous region 513 to the insulating layer 51 is 30% or more and 95% or less.

However, the ratio of the thickness of the resin region 511 and the ratio of the thickness of the porous region 513 are not limited to the ratios based on the insulating layer 51. For example, the ratios may be calculated based on the total thickness of the insulation film 5. Specifically, based on the insulation film 5, the total thickness of the resin regions 511 included in the multiple insulating layers 51 of the insulation film 5 may be 5% or more and 70% or less, and the total thickness of the porous regions 513 included in the multiple insulating layers 51 of the insulation film 5 may be 30% or more and 95% or less.

(4) The insulation film 5 is not limited to the one formed by stacking the multiple insulating layers 51 made of the same material. For example, the insulation film 5 may include an insulation film 5 formed of other insulating paint. In this case, different coating equipment and coating conditions may be used for each insulating paint to form the insulation film 5.

(5) An adhesion layer may be provided between the conductor 3 and the insulation film 5. For the adhesion layer, a material that can improve adhesion between the conductor 3 and the insulation film 5 may be used. The thickness of the adhesion layer is not particularly limited; however, it is preferable that the thickness of the adhesion layer does not impair the flexibility of the insulated wire 1. It is preferable that the thickness of the adhesion layer does not lower the partial discharge inception voltage. For example, the thickness of the adhesion layer is preferably 1 μm to 10 μm.

(6) An additive may be further added to the insulation film 5 and the insulating paint forming the insulation film 5. Type of the additives is not particularly limited. The additive may be added for the purposes of improving the strength of the insulation film 5, improving sliding properties of the surface of the insulation film 5, improving an abrasion resistance of the insulation film 5, improving stretching characteristics, reducing the relative permittivity, or making the film semiconductive, for example. For the additive, an antioxidant agent may be used.

(7) In the embodiment, the outer shape of the cross-sectional shape of the insulated wire 1 including the conductor 3 and the insulation film 5 is a circular shape; however, the outer shape of each component is not limited to the circular shape and may be formed into a rectangular shape or a polygonal shape.

What is claimed is:

1. An enameled insulated wire comprising:

a conductor formed into a long shape; and an insulation film formed by stacking at least three insulating layers covering a circumference of the conductor, wherein each of the insulating layers includes:

a first region, a porous region, formed of a thermosetting resin with multiple voids dispersed throughout the first region, and a second region, a resin region, formed of the thermosetting resin, wherein there is no boundary surface between the first region and second region in each of the insulating layers, and wherein in each of the insulating layers, a boundary surface is not provided between a first boundary surface located on a radially inner side and a second boundary surface located on a radially outer side, and the porous region and the resin region are arranged in this order from the first boundary surface toward the second boundary surface, and in each of the insulating layers, a surface of the porous region is arranged on the first boundary surface and a surface of the resin region is arranged on the second boundary surface, whereby the insulation film comprises a structure in which the porous regions and the resin regions of the insulating layers are alternately stacked.

2. The enameled insulated wire according to claim 1, wherein a ratio of a thickness of the resin region included in each insulating layer is 5% or more and 70% or less relative to a thickness of the insulating layer.

3. The enameled insulated wire according to claim 1, wherein a ratio of a thickness of the resin region included in each insulating layer is 20% or more and 70% or less relative to a thickness of the insulating layer.

4. The enameled insulated wire according to claim 1, wherein a ratio of a thickness of the resin region included in each insulating layer is 5% or more and 50% or less relative to a thickness of the insulating layer.

* * * * *